United States Patent
Carpenter et al.

(10) Patent No.: US 9,624,835 B2
(45) Date of Patent: Apr. 18, 2017

(54) ECOLOGY FUEL RETURN SYSTEMS

(71) Applicant: Hamilton Sundstrand Corporation, Charlotte, NC (US)

(72) Inventors: Richard J. Carpenter, Gales Ferry, CT (US); Kevin Gibbons, Torrington, CT (US); Charles E. Reuter, Granby, CT (US); Lubomir A. Ribarov, West Hartford, CT (US); Leo J. Veilleux, Jr., Wethersfield, CT (US); Ethan Flow, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 102 days.

(21) Appl. No.: 14/340,275

(22) Filed: Jul. 24, 2014

(65) Prior Publication Data

US 2016/0025015 A1 Jan. 28, 2016

(51) Int. Cl.
*B64D 37/28* (2006.01)
*B64D 37/32* (2006.01)
(Continued)

(52) U.S. Cl.
CPC .............. *F02C 9/26* (2013.01); *F01D 17/141* (2013.01); *F01D 17/145* (2013.01); *F02C 7/232* (2013.01);
(Continued)

(58) Field of Classification Search
CPC . B64C 3/34; F02C 7/232; F02C 9/263; F16K 31/18; F16K 31/20; F16K 31/22;
(Continued)

(56) References Cited

U.S. PATENT DOCUMENTS 397,895 A * 2/1889 Chase ..................... F16K 31/26
119/80
654,016 A * 7/1900 Miller ....................... B65B 1/36
137/433
(Continued)

FOREIGN PATENT DOCUMENTS

EP 0207198 A1 1/1987
GB 806742 A 12/1958

OTHER PUBLICATIONS

Extended European Search Report dated Dec. 14, 2015, issued on corresponding European Patent Application No. 15173904.2.

*Primary Examiner* — Kevin Lee
*Assistant Examiner* — Seth W McKay-Smith
(74) *Attorney, Agent, or Firm* — Locke Lord LLP; Scott D. Wofsy; Alicia J. Carroll

(57) ABSTRACT

A shut-off valve includes a float and a negative G control component. The float is configured to occlude a tank outlet at a first fluid level and 1 G and unocclude the tank outlet at a second fluid level and 1 G. The negative G control component is operatively connected to the float to limit fluid, e.g. liquid or gas, communication between a tank outlet and an ejector pump during negative G events. An ecology fuel return system includes a tank, an ejector pump, a float, and a negative G control component, as described above. The tank has an inlet and an outlet. The inlet is configured to be in fluid communication with components of an engine. The ejector pump is in fluid communication with the tank outlet and is configured to pump fuel from the tank to a fuel pump inlet of an engine.

9 Claims, 4 Drawing Sheets

(51) Int. Cl.
  *F16K 31/08* (2006.01)
  *F16K 31/22* (2006.01)
  *F02C 9/26* (2006.01)
  *F01D 17/14* (2006.01)
  *F02C 7/232* (2006.01)

(52) U.S. Cl.
  CPC ........ *F02C 9/263* (2013.01); *F05D 2300/507* (2013.01); *Y10T 137/0826* (2015.04); *Y10T 137/0898* (2015.04); *Y10T 137/7323* (2015.04); *Y10T 137/7436* (2015.04); *Y10T 137/7442* (2015.04)

(58) Field of Classification Search
  CPC ......... Y10T 137/0753; Y10T 137/0826; Y10T 137/0898; Y10T 137/7313; Y10T 137/7323; Y10T 137/7426; Y10T 137/7436; Y10T 137/7442
  USPC ..................................................... 244/135 R
  See application file for complete search history.

(56) References Cited

U.S. PATENT DOCUMENTS

| | | | | |
|---|---|---|---|---|
| 670,893 A * | 3/1901 | Donnelly | ................. | F16T 1/24 122/14.1 |
| 747,514 A * | 12/1903 | Tozier | ...................... | F22D 5/12 137/428 |
| 855,764 A * | 6/1907 | Gaylor | ..................... | F23D 5/14 137/400 |
| 1,062,847 A * | 5/1913 | Park | ......................... | F16K 31/22 137/151 |
| 1,139,130 A * | 5/1915 | McKeown | ............ | F16K 24/044 137/202 |
| 1,256,648 A * | 2/1918 | Benson | ................. | F16K 15/063 137/433 |
| 1,963,867 A * | 6/1934 | Robisch | .................. | F16K 31/20 137/211 |
| 2,438,245 A * | 3/1948 | Gregg | ...................... | F15B 1/26 137/312 |
| 2,603,230 A * | 7/1952 | Krieger, Jr. | ............. | F16K 13/10 137/202 |
| 2,886,056 A * | 5/1959 | Ratliff | ..................... | F16K 31/24 137/428 |
| 3,007,484 A * | 11/1961 | Hallinan | ................ | E03F 5/042 137/410 |
| 3,428,063 A | 2/1969 | Plotkin et al. | | |
| 3,810,714 A * | 5/1974 | Turner | .................... | F02C 7/232 417/182.5 |
| 3,841,089 A * | 10/1974 | Clark | ...................... | F02C 7/232 137/202 |
| 3,929,155 A * | 12/1975 | Garretson | ............... | F16K 31/18 137/430 |
| 4,066,386 A * | 1/1978 | Johnson | .................... | F04D 9/06 417/199.2 |
| 4,719,749 A | 1/1988 | Greune et al. | | |
| 4,831,990 A * | 5/1989 | Tuckey | ................ | B60K 15/077 123/510 |
| 5,447,175 A * | 9/1995 | Takaki | ................. | B60K 15/077 137/399 |
| 5,711,339 A * | 1/1998 | Kurihara | .......... | B60K 15/03519 123/198 D |
| 5,894,857 A * | 4/1999 | Takaki | ................. | B60K 15/077 123/514 |
| 6,442,925 B1 * | 9/2002 | Dalton | .................... | F02C 7/232 60/39.094 |
| 6,484,510 B2 | 11/2002 | Futa, Jr. et al. | | |
| 7,383,856 B2 * | 6/2008 | Martiš | .................. | B60K 15/035 123/518 |
| 7,726,112 B2 | 6/2010 | Dooley | | |
| 7,762,478 B1 | 7/2010 | Czimmek et al. | | |
| 7,882,823 B2 * | 2/2011 | Benjey | ............ | B60K 15/03519 123/518 |
| 8,100,153 B2 * | 1/2012 | Hirata | ..................... | F16K 31/22 137/202 |
| 8,122,699 B2 | 2/2012 | Lawrence et al. | | |
| 8,141,576 B2 * | 3/2012 | Matsuo | .................. | F16K 31/22 137/202 |
| 8,291,929 B2 * | 10/2012 | Greene | .................. | F16K 17/36 137/202 |
| 8,353,306 B2 | 1/2013 | Futa et al. | | |
| 8,602,362 B2 * | 12/2013 | Buchwald | ............. | B64D 37/24 220/88.3 |
| 8,925,322 B2 * | 1/2015 | Scully | ..................... | F02C 7/228 60/734 |
| 9,239,032 B2 * | 1/2016 | Hagen | ..................... | F02M 25/08 |
| 9,322,486 B2 * | 4/2016 | Smit | ...................... | B67D 7/365 |
| 9,434,246 B2 * | 9/2016 | Vulkan | .................... | F16K 24/042 |
| 9,447,733 B2 * | 9/2016 | Belleville | ............... | F02C 7/232 |
| 2004/0154302 A1 | 8/2004 | Wernberg et al. | | |
| 2008/0061171 A1 | 3/2008 | Bayer | | |
| 2008/0271456 A1 | 11/2008 | Scully et al. | | |
| 2010/0116361 A1 * | 5/2010 | Furuhashi | ............ | B60K 15/077 137/398 |
| 2010/0186828 A1 * | 7/2010 | Matsuzaki | ........... | F16K 24/044 137/202 |
| 2010/0187451 A1 | 7/2010 | Vinski et al. | | |
| 2011/0005614 A1 * | 1/2011 | Pifer | ................ | B60K 15/03519 137/409 |
| 2012/0271527 A1 | 10/2012 | Zebrowski et al. | | |
| 2013/0036738 A1 * | 2/2013 | Pora | ........................ | F02C 7/236 60/734 |
| 2014/0338752 A1 * | 11/2014 | Moreno | ............. | F02M 37/0023 137/2 |

* cited by examiner

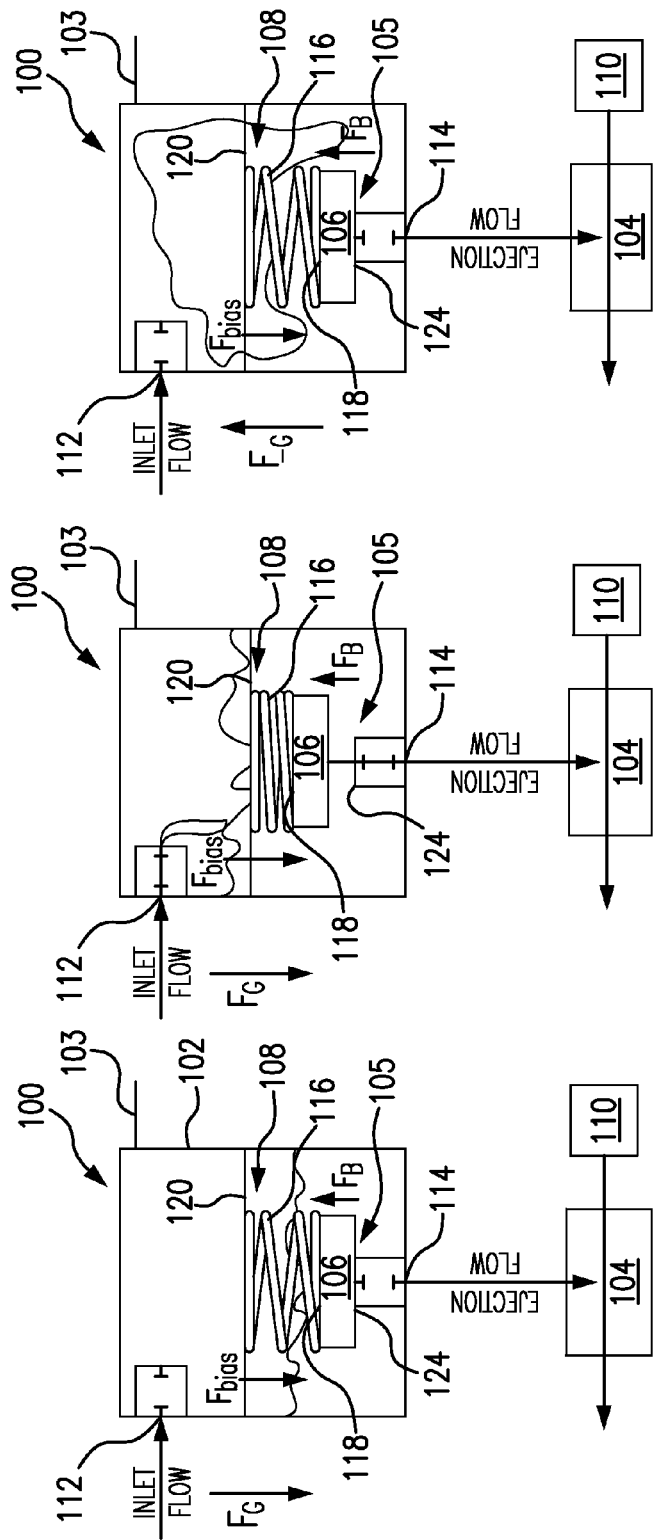
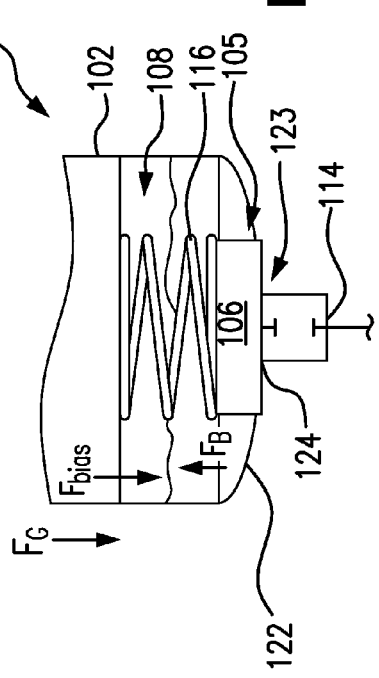

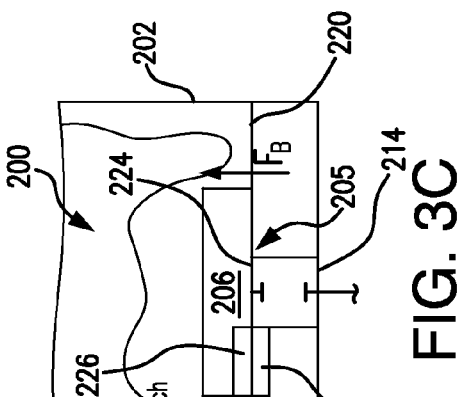
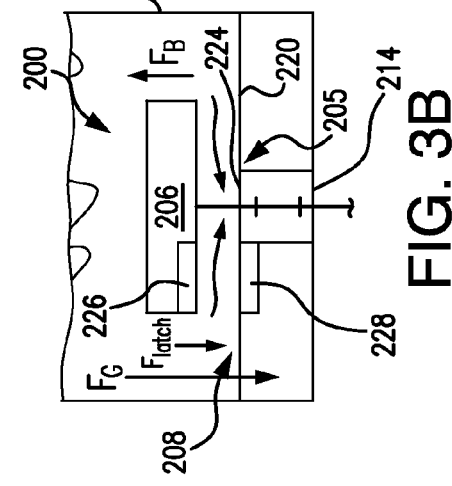
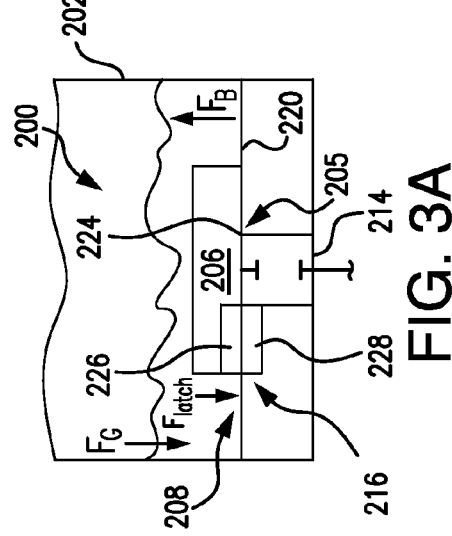
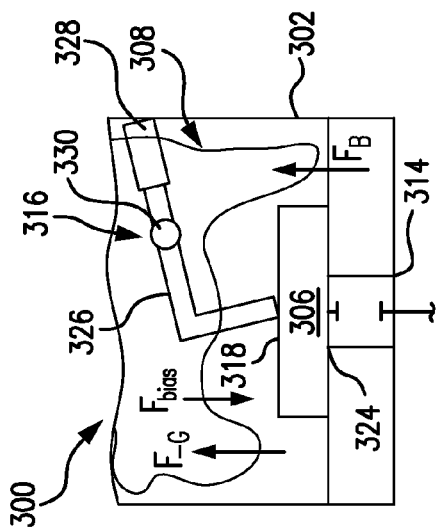
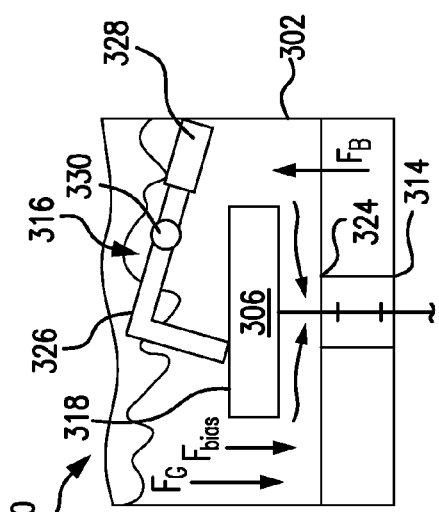
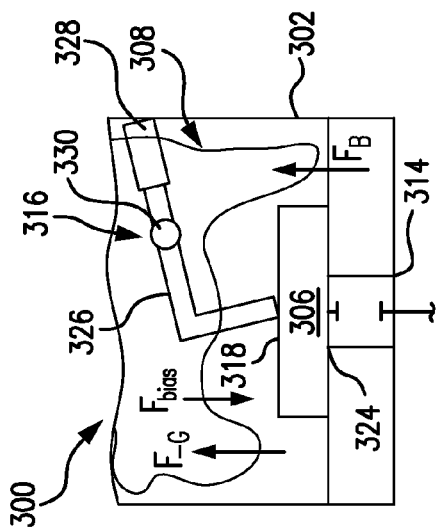

ECOLOGY FUEL RETURN SYSTEMS

BACKGROUND OF THE INVENTION

1. Field of the Invention

The present invention relates to fuel return systems, and, in particular, to valves in fuel return systems.

2. Description of Related Art

Traditional ecology fuel return systems can be found in gas turbine engines, for example, in gas turbine engines used in aircraft. A traditional ecology fuel return system is generally configured to remove a certain known amount of jet fuel from the engine's fuel manifolds, for example, fuel nozzle/injector manifolds, engine fuel supply lines, and the like, upon engine shutdown. Upon engine startup, the jet fuel from the ecology fuel return system is returned to the engine's fuel pump inlet via an ejector pump to be injected in the combustor thus providing stable engine idle operations. Ecology fuel return systems can minimize the amount of fuel left over in the engine's fuel system after engine shutdown, thus minimizing the possibility for any liquid fuel and/or any gaseous fuel vapor leaks into the environment. In addition, ecology fuel return systems can also prevent any potential coking of the fuel manifold nozzles and injectors by scavenging the "left-over" liquid fuel from the system upon engine shut-down. Finally, ecology fuel return systems can drain the combustor of any unused fuel upon engine shut-down thus preventing any smoke exhaust from the engine upon engine start-up and potentially causing some localized undesirable fuel-rich conditions in the combustor (i.e., "hot spots").

Traditional ecology fuel return systems can sometimes experience instability. For example, there is a potential for air leakage into the aircraft's fuel system under some circumstances, such as negative G events that can occur during some flight maneuvers. The air entrained in the fuel could interfere with normal operation of the engines.

Such conventional methods and systems have generally been considered satisfactory for their intended purposes. However, there is still a need in the art for systems and methods that allow for improved ecology fuel return systems. The present invention provides a solution for these problems.

SUMMARY OF THE INVENTION

A shut-off valve includes a float and a negative G control component. The float is configured to occlude a tank outlet at a first fluid level and 1 G and unocclude the tank outlet at a second fluid level and 1 G. The negative G control component is operatively connected to the float to limit fluid communication between a tank outlet and an ejector pump during negative G events.

The negative G control component can include a biasing component. The biasing component can be configured to apply a biasing force to the float. The biasing force can be greater than a pre-determined negative G event force and less than the buoyancy force of the float at 1 G. In an occluded position the biasing force of the biasing component can be greater or equal to the buoyancy force of the float at 1 G. In an unoccluded position the biasing force of the biasing component can be less than the buoyancy force of the float at 1 G.

The biasing component can include a spring operatively connected to a top portion of the float. The biasing component can include a spring retaining feature operatively connected to the spring opposing the float. It is also contemplated that the biasing component can include a magnet and a corresponding target, wherein one of the magnet and the target can be fixedly connected to the float. One of the magnet and the target can be fixedly connected to a magnet retaining feature.

The biasing component can include a counterweighted lever, wherein the counterweighted lever includes a lever arm and an opposing ballast with a pivot point therebetween. The counterweighted lever can include a spring operatively connected to the lever arm for loading the lever arm against a top portion of the float.

In embodiments, the negative G control component includes a slosh plate disposed proximate to the float surrounding at least a portion of the float. The slosh plate can be configured to concentrate fluid between the slosh plate and the float during a negative G event to damp the displacement of the float against a negative G event force.

In another aspect, the negative G control component can include a check valve in fluid communication with the float. The check valve can be configured to block fluid flow from a tank outlet to an ejector pump during negative G events. The check valve can include a poppet configured to translate between a first and a second position along a valve axis. In the first position, at 1 G or greater, the poppet can be in an unoccluded position. In the second position, the mass force of the poppet can be less than a pre-determined negative G event force such that the poppet is in an occluded position to block fluid flow to the ejector pump.

An ecology fuel return system includes a tank, an ejector pump, a float, and a negative G control component, as described above. The tank has an inlet and an outlet, wherein the inlet is configured to be in fluid communication with components of an engine for recovery of fuel. The ejector pump is in fluid communication with the outlet of the tank and is configured to pump fuel from the tank to a fuel pump inlet of an engine.

In embodiments including the slosh plate, as described above, the slosh plate can be connected to the tank between the inlet and the float. It is contemplated that the ecology fuel return system can include a boost pump in fluid communication with the ejector pump. The boost pump can be configured to induce fuel flow through the ejector pump from a fuel pump inlet of an engine.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 1A is a schematic cross-sectional view of an exemplary embodiment of an ecology fuel return system constructed in accordance with the present disclosure, showing the biasing component as a spring and the float in an occluded position under positive G forces;

FIG. 1B is a schematic cross-sectional view of the ecology fuel return system of FIG. 1A, showing the float in an unoccluded position under positive G forces;

FIG. 1C is a schematic cross-sectional view of the ecology fuel return system of FIG. 1A, showing the float in an occluded position under negative G forces;

FIG. 2 is a schematic cross-sectional view of a portion of another exemplary embodiment of an ecology fuel return system constructed in accordance with the present disclosure, showing the tank with a sloped bottom;

FIG. 3A is a schematic cross-sectional view of a portion of another exemplary embodiment of an ecology fuel return system constructed in accordance with the present disclosure, showing the biasing component as a magnet and a target, and the float in an occluded position under positive G forces;

FIG. 3B is a schematic cross-sectional view of the ecology fuel return system of FIG. 3A, showing the float in an unoccluded position under positive G forces;

FIG. 3C is a schematic cross-sectional view of the ecology fuel return system of FIG. 3A, showing the float in an occluded position under negative G forces;

FIG. 4A is a schematic cross-sectional view of a portion of another exemplary embodiment of an ecology fuel return system constructed in accordance with the present disclosure, showing the biasing component as a counterweighted lever and the float in an occluded position under positive G forces;

FIG. 4B is a schematic cross-sectional view of the ecology fuel return system of FIG. 4A, showing the float in an unoccluded position under positive G forces;

FIG. 4C is a schematic cross-sectional view of the ecology fuel return system of FIG. 4A, showing the float in an occluded position under negative G forces;

DETAILED DESCRIPTION OF THE PREFERRED EMBODIMENTS

Figure 5:
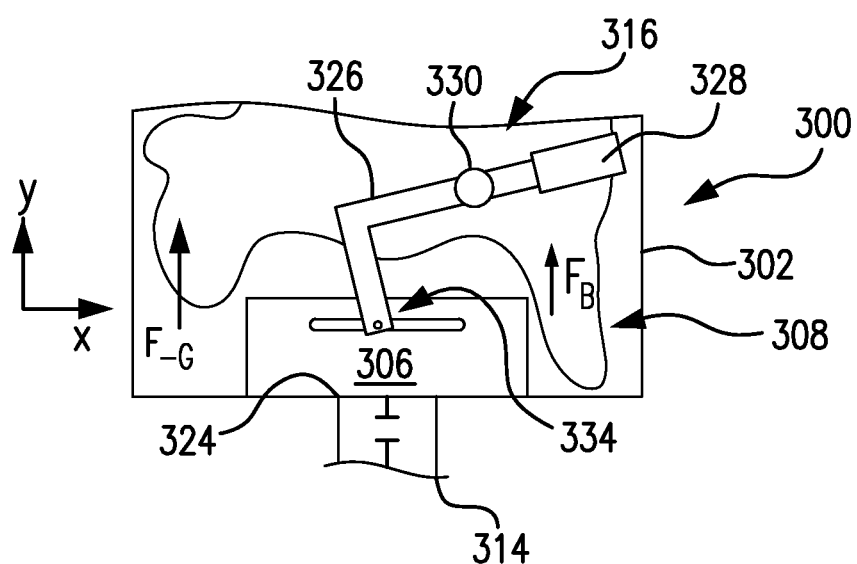
FIG. 5 is a schematic cross-sectional view of a portion of another exemplary embodiment of an ecology fuel return system constructed in accordance with the present disclosure, showing the biasing component as a counterweighted lever with a slotted pivot connecting the lever to the float.

Reference will now be made to the drawings wherein like reference numerals identify similar structural features or aspects of the subject disclosure. For purposes of explanation and illustration, and not limitation, a perspective view of an exemplary embodiment of an ecology fuel return system in accordance with the disclosure is shown in FIG. 1A and is designated generally by reference character 100. Other embodiments of ecology fuel return systems in accordance with the disclosure, or aspects thereof, are provided in FIGS. 1B-7C, as will be described. The systems and methods of the invention can be used to reduce the entrainment of continuous airflow into the fuel system, for example during negative G loading events, such as during aircraft maneuvers and turbulence, where the tank is driven to accelerate against gravity.

As shown in FIG. 1A, an ecology fuel return system 100 includes a tank 102, an ejector pump 104, a boost pump 110, and a shut-off valve 105 with a float 106 and a negative G control component 108. Tank 102 has an inlet 112, an outlet 114 and a vent 103. Vent 103 prevents pressurization of and a vacuum in tank 102. A vacuum in tank 102 can prevent fluid flow, e.g. liquid and/or gas flow, when valve 105 opens. Inlet 112 is configured to be in fluid communication with components of an engine (not shown) for recovery of fuel. Ejector pump 104 is in fluid communication with outlet 114 of tank 102 and is configured to pump fuel from tank 102 to a fuel pump inlet of the engine (not shown). Boost pump 110 is in fluid communication with ejector pump 104. Boost pump 110 is configured to induce fuel flow through ejector pump 104 from the fuel pump inlet of the engine.

With reference to FIGS. 1A-C, float 106 is configured to occlude tank outlet 114 at a first fluid level and 1 G, shown in FIG. 1A, and unocclude tank outlet 114 at a second fluid level and 1 G, shown in FIG. 1B. FIGS. 1A and 1B are examples of float 106 positions during positive G scenarios. Negative G control component 108 is operatively connected to float 106 to limit fluid communication between tank inlet 112 and/or vent 103, and ejector pump 104 during negative G events, for example the negative G event shown in FIG. 1C.

With continued reference to FIGS. 1A-1C, negative G control component 108 includes a biasing component 116 shown as a spring. Biasing component 116, e.g. spring, also includes a spring retaining feature 120 operatively connected to spring 116 opposing float 106. Spring 116 is configured to apply a biasing force $F_{bias}$ to float 106. Spring 116 is operatively connected to a top portion 118 of float 106 and to spring retaining feature 120. The direction of biasing force $F_{bias}$ is indicated schematically by a downward pointing arrow in FIGS. 1A-1C.

As shown in FIG. 1A, biasing force $F_{bias}$ of spring 116 is greater or equal to a buoyancy force $F_B$ of float 106 at a first fluid level and 1 G. The direction of buoyancy force $F_B$ of float 106 is indicated schematically by an upward pointing arrow on the right-hand side, as oriented in FIGS. 1A-1C. The direction of the G force, $F_G$, is indicated schematically by a downward pointing arrow on the left-hand side as oriented in FIG. 1A. Those skilled in the art will readily appreciate that proper sizing of this design results in sizing float 106 so that as the fluid level in tank 102 increases, its buoyancy force $F_B$ can overcome biasing force $F_{bias}$ of spring 116.

With reference now to FIG. 1B, as the fluid level in tank 102 increases, biasing force $F_{bias}$ of spring 116 becomes less than buoyancy force $F_B$ of float 106 at 1 G. The direction of G force $F_G$ is indicated schematically by a downward pointing arrow on the left-hand side, as oriented in FIG. 1B. As float 106 rises, it further compresses spring 116 and moves to an unoccluded position. This increases the force limiting the movement of float 106, and, therefore also limits the resulting float 106 displacement. In the unoccluded position, float 106 does not block fluid communication through shut-off valve 105 to ejector pump 104. Fluid travels from tank inlet 112, through shut-off valve 105, as indicated by the two inward pointing arrows, to tank outlet 114, and to ejector pump 104.

Referring now to FIG. 1C, ecology fuel return system 100 is shown in a negative G event. The negative G event causes a negative G force $F_{-G}$. The direction of negative G force $F_{-G}$ is indicated schematically by an upward pointing arrow on the left-hand side, as oriented in FIG. 1C. This negative G force, in traditional ecology fuel return systems, with the aircraft in its normal flight attitude, tends to cause fluid in a tank and a float to move upwards, allowing air to flow from the tank to be drawn into a pump and into a corresponding engine. In ecology fuel return system 100, biasing force $F_{bias}$ of spring 116 is greater than negative G event force $F_{-G}$ so that when buoyancy force $F_B$ of float 106 decreases due to the fluid moving out from under float 106, biasing force $F_{bias}$ of spring 116 overcomes negative G event force $F_{-G}$ and forces float 106 to an occluded position covering tank outlet 114 and reducing the air ingestion via ejector pump 104. Ecology fuel return system 100 allows the fluid level to be above shut-off valve opening 124, such that float 106 will be partially submerged leaving more residual fluid in tank 102 at shut-off. Those skilled in the art will readily appreciate that a small amount of fuel remaining in tank 102 after engine shut-off tends to ensure minimal air entrapment in the fuel supply lines upon engine re-start, helping to avoid any discontinuous fuel supply to the engine's fuel injectors. It is contemplated that in some applications residual fluid in tank 102 can be reduced by sloping the bottom of tank 102 towards shut-off valve opening 124 and outlet 114, as described below with respect to FIG. 2.

As shown in FIG. 2, ecology fuel return system 100 is shown with a shut-off valve opening 124 closer to a bottom 123 of tank 102. Bottom 123 of tank 102 also includes a slope 122 towards shut-off valve opening 124 and outlet 114. Sloped tank bottom 123 limits the accumulated fluid volume in tank 102 at shut-off. The angle and overall shape of slope 122 are such that the remaining fuel volume is minimized. Those skilled in the art will readily appreciate that by reducing the amount of fuel volume left over in the ecology fuel tank after engine shut-off a smaller ecology fuel tank can be used, therein reducing the overall weight of the system, fuel spill potential and release of fuel vapors can be reduced, therein mitigating potential environmental impact, and the propensity for visible exhaust smoke during cold engine re-start can be reduced. It is contemplated that there are a variety of suitable geometric configurations for tank bottom 123 that can be used.

Now with reference to FIGS. 3A-3C, another exemplary embodiment of an ecology fuel return system 200 is shown. Ecology fuel return system 200 is similar to ecology fuel return system 100, except that a negative G control component 208 of system 200 includes a biasing component 216 that is a magnet 226 and a corresponding target 228 instead of a spring. Magnet 226 is connected to float 206 and target 228 is connected to a magnet retaining feature 220. Those skilled in the art will readily appreciate that magnet 226 can alternatively be connected to magnet retaining feature 220 and target 228 can be connected to float 206. It is also contemplated that magnet 226 and its respective target 228 can be oriented in a variety of suitable positions and have a variety of suitable geometric shapes, as needed for a given application.

As shown in FIG. 3A, a biasing force $F_{bias}$ of biasing component 216, e.g. a latching force $F_{latch}$ of magnet 226 and target 228, is greater or equal to a buoyancy force $F_B$ of float 206 at a first fluid level and a G force $F_G$, e.g. 1 G, similar to ecology fuel return system 100 shown in FIG. 1A. The direction of G force $F_G$ is indicated schematically by a downward pointing arrow on the left-hand side, as oriented in FIGS. 3A and 3B. The direction of latching force $F_{latch}$ is indicated schematically by a downward pointing arrow in FIGS. 3A-3C. The direction of buoyancy force $F_B$ is indicated schematically by an upward pointing arrow on the right-hand side, as oriented in FIGS. 3A-3C. Those skilled in the art will readily appreciate that magnet 226, e.g. permanent magnet, and target 228, e.g. magnetically permeable target, are brought close enough in proximity in order to induce a magnetic attraction force, e.g. $F_{latch}$, large enough to close float 206 and/or to keep float 206 closed.

With reference now to FIG. 3B, as the fluid level in tank 202 increases, latching force $F_{latch}$ of magnet 226 and target 228 becomes less than buoyancy force $F_B$ of float 206 at a second fluid level and 1 G, similar to ecology fuel return system 100 shown in FIG. 1B. As the fluid level in tank 202 rises, buoyancy force $F_B$ of float 206 overcomes latching force $F_{latch}$ of magnet 226 and target 228 and float 206 moves into an unoccluded position, similar to unoccluded position described above with respect to FIG. 1B. Because $F_{latch}$ only acts in close proximity between magnet 226 and target 228, once latching force $F_{latch}$ is overcome there is no additional load on float 206 as there is with float 106 of ecology fuel return system 100.

Referring now to FIG. 3C, a negative G event, similar to the negative G event described above with respect to ecology fuel return system 100, is shown. In ecology fuel return system 200, latching force $F_{latch}$ of magnet 226 and target 228 is greater than negative G event force $F_{-G}$, the direction of which is indicated schematically by an upward pointing arrow, in order to overcome negative G event force $F_{-G}$, similar to biasing force $F_{bias}$ of spring 116 as described above with respect to FIG. 1C. Ecology fuel return system 200 with the magnet design also allows the fluid level to be above opening 224 of shut-off valve 205, as described above with respect to ecology fuel return system 100. Those skilled in the art will readily appreciate that residual fluid in tank 202 can be reduced by having the latching distance between magnet 226 and target 228 kept to a minimum. It is also contemplated that the residual fluid can be reduced by sloping the bottom of tank 202 toward opening 224 and outlet 214, and/or having opening 224 of shut-off valve 205 closer to the bottom of tank 202, similar to tank 102 shown in FIG. 2.

As shown in FIGS. 4A-4C, another embodiment of an ecology fuel return system 300 is shown. Ecology fuel return system 300 is similar to ecology fuel return system 100, except that a negative G control component 308 of system 300 includes a biasing component 316 that is a counterweighted lever. Biasing component 316, e.g. counterweighted lever, includes a lever arm 326 and an opposing ballast 328 with a pivot point 330 therebetween. A coil spring at pivot point 330 operatively connects to lever arm 326 for loading lever arm 326 against a top portion 318 of float 306.

Referring now to FIG. 4A, a biasing force $F_{bias}$ of counterweighted lever 316, the direction of which is indicated schematically by a downward pointing arrow in FIGS. 4A-4C, is greater or equal to a buoyancy force $F_B$ of float 306, the direction of which is indicated schematically by an upward pointing arrow in FIGS. 4A-4C, at a first fluid level and a G force $F_G$, e.g. 1 G, similar to ecology fuel return system 100 shown in FIG. 1A. The direction of G force $F_G$ is indicated schematically by a downward pointing arrow on the left-hand side, as oriented in FIGS. 4A and 4B. At this position, counterweighted lever 316 is nearly in force-balance about pivot point 330 with a slight bias provided by the coil spring to keep lever arm 326 in contact with float 306.

With reference now to FIG. 4B, as the fluid level in tank 302 increases, the biasing force $F_{bias}$ of counterweighted lever 316 becomes less than buoyancy force $F_B$ of float 306 at 1 G and float 306 moves into an unoccluded position, similar to ecology fuel return system 100 shown in FIG. 1B, described above. Similar to ecology fuel return system 100, the spring load on the coil spring also increases as the fluid level in tank 302 increases, but by a smaller magnitude since it is contributing only the force required to offset the counter weight at a zero G force. This reduced spring load reduces the buoyancy force $F_B$ required to move float 306 to an occluded position, reducing the size of float 306 required.

Referring now to FIG. 4C, a negative G event is shown. The negative G event is similar to the negative G event shown and described with respect to FIG. 1C. The direction of negative G force $F_{-G}$ is indicated schematically by an upward pointing arrow. In ecology fuel return system 300, a torque about pivot point 330 fixed to tank 302 is generated to keep float 306 in the closed position during the negative G event. Ecology fuel return system 300 also allows the fluid level to be above shut-off valve opening 324, similar to ecology fuel return system 100 described above. It is contemplated that residual fluid left in tank 302 can be reduced by sloping the bottom of tank 302 toward shut-off valve opening 324 and outlet 314, and/or having shut-off valve opening 324 closer to the bottom of tank 302, similar to tank 102 shown in FIG. 2.

As shown in FIG. 5, counterweighted lever 316 includes a slotted pivot 334 instead of the coil spring to operatively connect lever arm 326 and float 306. Those skilled in the art will readily appreciate that slotted pivot 334 may tend to cause counterweighted lever 316 to be susceptible to positive G events that drive float 306 to close when it may need to be open to drain tank 302. For example, additional lateral displacement of tank 302 may cause internal fluid displacement that could cause float 306 to rise, potentially ingesting air even when under positive G forces. Those skilled in the art will readily appreciate that internal baffles (not shown) may be used to limit such displacement. System 300 with slotted pivot 334 also decreases the number of degrees of freedom (DOF) by one (in the z-direction, i.e., in/out of the page as oriented in FIG. 5). Movements in the horizontal (x-direction) and vertical (y-direction), indicated schematically by the axis arrows on the left-hand side as oriented in FIG. 5, are allowed. System 300 with coil spring, shown in FIGS. 4A-4C, allows 3 DOF in the x-, y-, and z-directions.

Figure 6A:
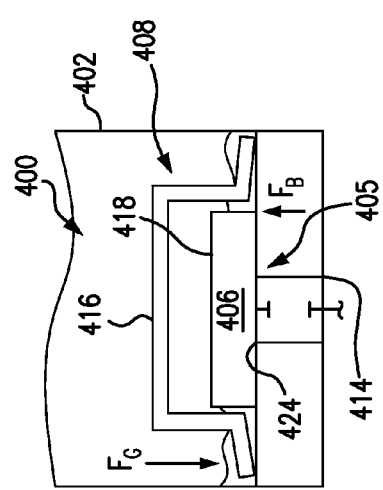
FIG. 6A is a schematic cross-sectional view of a portion of another exemplary embodiment of an ecology fuel return system constructed in accordance with the present disclosure, showing the slosh plate and the float, where the float is in an occluded position under positive G forces.
Figure 6B:
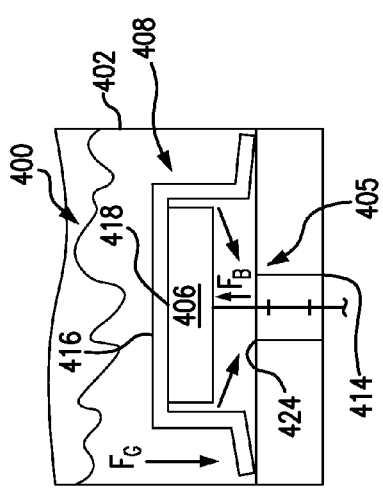
FIG. 6B is a schematic cross-sectional view of the ecology fuel return system of FIG. 4A, showing the float in an unoccluded position under positive G forces.
Figure 6C:
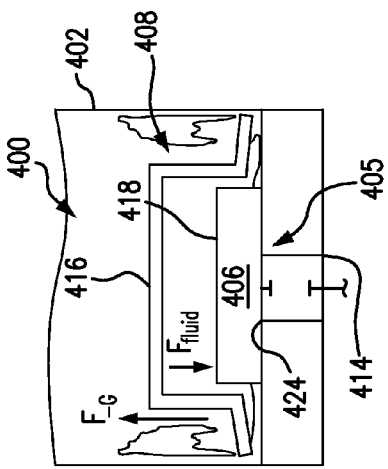
FIG. 6C is a schematic cross-sectional view of the ecology fuel return system of FIG. 4A, showing the float in an occluded position under negative G forces.

As shown in FIGS. 6A-C, another embodiment of an ecology fuel return system 400 is shown. Ecology fuel return system 400 is similar to ecology fuel return system 100, except that negative G control component 408 does not include a biasing component, e.g. spring 116, as shown and described above with respect to FIGS. 1A-1C. Instead, negative G control component 408 includes a slosh plate 416 disposed proximate to float 406 surrounding at least a portion of float 406. Slosh plate 416 is connected to tank 402 between an inlet, not shown, but similar to inlet 112, and float 406. Those skilled in the art will readily appreciate that ecology fuel return system 400 has no moving parts except for float 406, therefore advantageously reducing the possible failure modes.

Referring now to FIG. 6A, float 406 is in a similar position as described above with respect to FIG. 1A. Float 406, however, does not include a biasing component. Therefore, a buoyancy force $F_B$ of float 406 does not have to overcome any additional force in order to provide fluid flow to the ejector pump, not shown, at a G force $F_G$, e.g. 1 G. The direction of G force $F_G$ is indicated schematically by a downward pointing arrow on the left-hand side, as oriented in FIGS. 6A and 6B. Ecology fuel return system 400 also allows the fluid level to be above an opening 424 of shut-off valve 405, similar to ecology fuel return system 100 described above. It is contemplated that residual fluid left in tank 402 can be reduced by sloping the bottom of tank 402 towards shut-off valve opening 424 and outlet 414, and/or having shut-off valve opening 424 closer to the bottom of tank 402, similar to tank 102 shown in FIG. 2.

As shown in FIG. 6B, as the fluid level in tank 402 increases, buoyancy force $F_B$ of float 406 at 1 G increases and float 406 moves into an unoccluded position above opening 424 of shut-off valve 405, similar to ecology fuel return system 100 shown in FIG. 1B, described above. The direction of buoyancy force $F_B$ is indicated schematically by an upward pointing in FIGS. 6A-6B. It is contemplated that a top of float 418 may contact slosh plate 416, but that top of float 418 can be shaped in a way as to permit the fluid to flow between it and slosh plate 416. For example, it is contemplated that, the top of float 418 may have any continuous smooth geometrical shape that allows free contact between the top of float 418 and slosh plate 416, such as spherical, concave, convex, linear, or the like.

Now with reference to FIG. 6C, a negative G event is shown. The negative G event is similar to the negative G event shown and described with respect to FIG. 1C. Slosh plate 416 is configured to concentrate fluid between slosh plate 416 and float 406 during the negative G event to damp the displacement of float 406 against a negative G event force $F_{-G}$. The direction of negative G force $F_{-G}$ is indicated schematically by an upward pointing arrow on the left-hand side, as oriented in FIG. 6C. The surface area of slosh plate 416 where top of float 418 and slosh plate 416 meet is smaller than the collection area of slosh plate 416 near the bottom of tank 402. During a negative G event, this difference assists in concentrating the fluid volume as it displaces into slosh plate 416. The volume of fluid concentrated under slosh plate 416 and the resulting momentum of that fluid provides a force $F_{fluid}$ to limit float 406 displacement and drive float 406 back to the occluded position directly above opening 424 of shut-off valve 405. The amount of fluid volume displaced and the velocity of the displaced fluid limits the duration of force $F_{fluid}$. The direction of force $F_{fluid}$ is indicated schematically by a downward pointing arrow. Those skilled in the art will readily appreciate that float 406 and fluid may initially displace together during the negative G event, potentially allowing a temporary ingestion of air into fuel system 400.

Figure 7A:
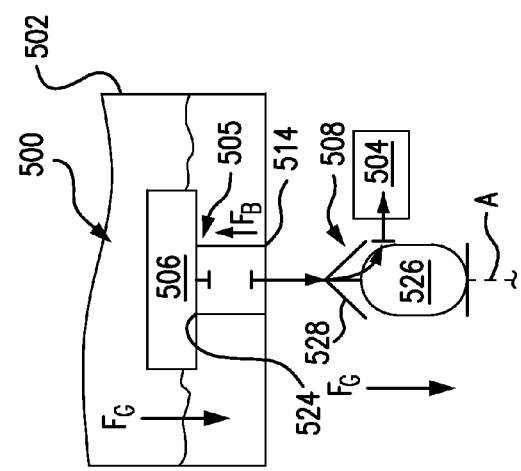
FIG. 7A is a schematic cross-sectional view of a portion of another exemplary embodiment of an ecology fuel return system constructed in accordance with the present disclosure, showing the check valve and the poppet in an unoccluded position and the float in an occluded position under positive G forces.
Figure 7B:
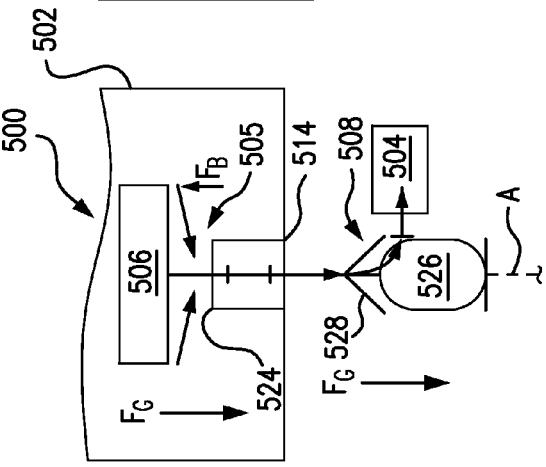
FIG. 7B is a schematic cross-sectional view of the ecology fuel return system of FIG. 4A, showing the check valve and the poppet in an unoccluded position and the float in an unoccluded position under positive G forces.
Figure 7C:
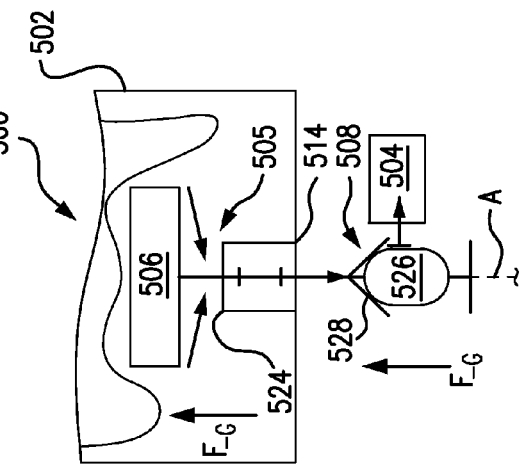
FIG. 7C is a schematic cross-sectional view of the ecology fuel return system of FIG. 4A, showing the check valve and the poppet in an occluded position and the float in an unoccluded position under negative G forces.

As shown in FIGS. 7A-7C, another embodiment of an ecology fuel return system 500 is shown. Ecology fuel return system 500 is similar to ecology fuel return system 100, except that a negative G control component 508 does not include a biasing component, e.g. spring 116, as shown and described above with respect to FIGS. 1A-1C. Instead, negative G control component 508 is a check valve in fluid communication with a float 506. Negative G control component 508, e.g. check valve, includes a poppet 526 configured to freely translate along a valve axis A. Poppet 526 is configured to translate between a first unoccluded position, shown in FIGS. 7A and 7B, and a second occluded position, shown in FIG. 7C. Check valve 508 is configured to block fluid flow from a tank outlet 514 to an ejector pump 504 during negative G events. Ejector pump 504 is similar to ejector pump 104, described above. It is contemplated that a boost pump, similar to boost pump 110, while not shown, can be in fluid communication with ejector pump 504.

Now with reference to FIG. 7A, in a first position, at a first fluid level and at 1 G or greater, poppet 526 is in an unoccluded position. Float 506 is in a similar occluded position, above and opening 524 of shut-off valve 505, as described above with respect to FIG. 1A. Float 506, however, does not include a biasing component, e.g. spring 116. Therefore, a buoyancy force $F_B$ of float 506 does not have to overcome any additional force in order to provide fluid flow to ejector pump 504 at a G force $F_G$, e.g. 1 G. The direction of G force $F_G$ is indicated schematically by downward pointing arrows on the left-hand side, as oriented in FIGS. 7A and 7B. The direction of buoyancy force $F_B$ is indicated schematically by an upward pointing arrow on the right-hand side, as oriented in FIGS. 7A-7B.

As shown in FIG. 7B, as the fluid level in tank 502 increases, buoyancy force $F_B$ of float 506 at 1 G or greater increases and float 506 moves into an unoccluded position, similar to ecology fuel return system 100 shown in FIG. 1B, described above. Poppet 526 remains in an unoccluded position to allow fluid to flow to ejector pump 504.

Now with reference to FIG. 7C, a negative G event is shown. The negative G event is similar to the negative G event shown and described with respect to FIG. 1C. The direction of a negative G force $F_{-G}$ is indicated schematically by upward pointing arrows on the left-hand side, as oriented in FIG. 7C. Float 506, however does not have any biasing component, for example spring 116, or a damping component, e.g. slosh plate 416, thus float 506 is sensitive to the influence of external loads as shut-off valve 505 operates with low-to-no force margin to keep it closed. Therefore, float 506 is forced upwards, as oriented in FIG. 7C, and remains in an unoccluded position during a negative G event. During a negative G event, poppet 526 is also forced upwards, as oriented in FIG. 7C, and seats in valve inlet 528, sealing valve inlet 528 and preventing flow from tank outlet 514 to ejector pump 504.

Those skilled in the art will readily appreciate that poppet 526 can have a variety of suitable sizes and shapes, but generally should be large enough to allow for an adequate sealing surface, and small enough to minimize drag effects on poppet 526 that could prevent it from seating properly in valve inlet 528. It is contemplated that poppet 526 can be made of a dense material, such that poppet 526 has a sufficient momentum during a negative G event to properly seal valve inlet 528. Those skilled in the art will readily appreciate that by minimizing the actuation distance, e.g. the distance poppet 526 needs to travel along valve axis A from a full open position, shown in FIG. 7A, to full closed position, shown in FIG. 7C, the amount of air that can be ingested by ejector pump 504 during the closing of valve inlet 528 at the beginning of the negative G event tends to be reduced. It is also contemplated that a poppet guide can be designed to prevent any movement of poppet 526 in unintended alternate directions, e.g. directions at an angle with respect to valve axis A. Those skilled in the art will also readily appreciate that because poppet 526 is essentially unrestricted along valve axis A, contact surfaces of poppet 526 can be designed to minimize or eliminate negative effects caused by poppet vibration.

The methods and systems of the present disclosure, as described above and shown in the drawings, provide for ecology fuel return systems with superior properties including reduced air ingestion into the engine's main fuel lines during negative G events. Reduced airflow into the engine's main fuel lines, in turn, can reduce fuel coking and plugging of fuel injectors and nozzles, which increases the possibility that the engine will operate at full power and efficiency, reduce fuel pump degradation, reduce the possibility of fuel cavitation in the main fuel pump, and reduce the possibility of in-flight shut-downs. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A shut-off valve comprising:
   a tank having an inlet and an outlet, and a flow path in a positive G direction defined between the tank inlet and the tank outlet;
   a float configured to occlude the tank outlet at a first fluid level and 1 G and unocclude the tank outlet at a second fluid level and 1 G; and
   a negative G control component operatively connected to the float to limit fluid communication between a tank outlet and an ejector pump during negative G events, wherein the negative G control component includes a biasing component, wherein the biasing component is configured to apply a biasing force to the float, wherein, in an unoccluded position, the biasing force is greater than a pre-determined negative G event force and less than the buoyancy force of the float at 1 G, and wherein the buoyancy force of the float is in the opposite direction of the biasing force.

2. A shut-off valve as recited in claim 1, wherein in an occluded position the biasing force of the biasing component is greater or equal to the buoyancy force of the float at 1 G.

3. A shut-off valve as recited in claim 1, wherein the biasing component includes a spring operatively connected to a top portion of the float.

4. A shut-off valve as recited in claim 3, further comprising a spring retaining feature operatively connected to the spring opposite from the float.

5. A shut-off valve as recited in claim 1, wherein the biasing component includes a magnet and a corresponding target, wherein one of the magnet and the target is fixedly connected to the float.

6. A shut-off valve as recited in claim 5, wherein one of the magnet and the target is fixedly connected to a magnet retaining feature.

7. A shut-off valve as recited in claim 1, wherein the biasing component includes a counterweighted lever, wherein the counterweighted lever includes a lever arm and an opposing ballast with a pivot point therebetween.

8. A shut-off valve as recited in claim 7, wherein the counterweighted lever includes a spring operatively connected to the lever arm for loading the lever arm against a top portion of the float.

9. An ecology fuel return system, comprising:
   a tank having an inlet and an outlet, and a flow path in a positive G direction defined between the tank inlet and the tank outlet, wherein the inlet is configured to be in fluid communication with components of an engine for recovery of fuel;

an ejector pump in fluid communication with the outlet of the tank, wherein the ejector pump is configured to pump fuel from the tank to a fuel pump inlet of an engine;

a float configured to occlude the tank outlet at a first fluid level and 1 G and unocclude the tank outlet at a second fluid level and 1 G; and a negative G control component operatively connected to the float to limit fluid communication between the tank inlet and the ejector pump during negative G events, wherein the negative G control component includes a biasing component, wherein the biasing component is configured to apply a biasing force to the float, wherein, in an unoccluded position, the biasing force is greater than a pre-determined negative G event force and less than the buoyancy force of the float at 1 G, and wherein the buoyancy force of the float is in the opposite direction of the biasing force.

* * * * *